United States Patent [19]

Motoyama et al.

[11] 4,232,331
[45] Nov. 4, 1980

[54] CIRCUIT FOR STABILIZING THE BLACK LEVEL IN AN OUTPUT SIGNAL OF A CAMERA TUBE IN A COLOR TELEVISION CAMERA

[75] Inventors: Koichiro Motoyama, Ninomiya; Itsuo Takanashi, Yokohama; Tadayoshi Miyoshi, Yokohama; Shintaro Nakagaki, Yokohama; Sumio Yokokawa, Yokohama; Kenichi Miyazaki, Sagamihara, all of Japan

[73] Assignee: Victor Company of Japan, Ltd., Yokohama, Japan

[21] Appl. No.: 948,253

[22] Filed: Oct. 3, 1978

[30] Foreign Application Priority Data

Oct. 4, 1977 [JP] Japan .................................. 52/118553

[51] Int. Cl.³ .......................... H04N 9/07; H04N 5/16
[52] U.S. Cl. ....................................... 358/44; 358/221
[58] Field of Search ....................................... 358/44–47, 358/43, 34, 172, 221, 50, 41

[56] References Cited

U.S. PATENT DOCUMENTS

| 3,558,809 | 1/1971 | Aoki | 358/221 |
| 3,584,146 | 6/1971 | Cath et al. | 358/221 |
| 3,602,641 | 8/1971 | Heise | 358/221 |
| 3,737,571 | 6/1973 | Gaebele et al. | 358/221 |
| 3,839,669 | 10/1974 | Infante et al. | 358/172 |

*Primary Examiner*—John C. Martin

[57] ABSTRACT

A circuit for stabilizing the black level in an output signal of a camera tube is employed in a color television camera. The camera tube has an optical filter with an optically black part extending in parallel with a beam scanning direction of the camera tube. The stabilizing circuit comprises a clamping circuit for clamping an output signal of the camera tube during a horizontal beam blanking period and for restoring a DC component of the output signal. A circuit responds to supplied sampling pulses during every vertical scanning period, for sampling and holding an output signal of the clamping circuit. A circuit feeds back a substantially negative holding voltage of the sampling and holding circuit, to the clamping circuit.

6 Claims, 8 Drawing Figures

CIRCUIT FOR STABILIZING THE BLACK LEVEL IN AN OUTPUT SIGNAL OF A CAMERA TUBE IN A COLOR TELEVISION CAMERA

BACKGROUND OF THE INVENTION

The present invention relates generally to circuits for stabilizing black levels in the output signal of camera tubes in color television cameras, and more particularly to a circuit for stabilizing the black level in an image output signal of a camera tube irrespective of fluctuations and nonuniformity of the dark current of the camera tube in a color television camera.

In general, a dark current exists in the camera tube of a color television camera. This dark current is not continually constant, but fluctuates or becomes irregular. When there is a fluctuation in this dark current, the white balance is destroyed. Particularly in a frequency separation system in which a stripe filter is used, the green color signal transmitted at low frequency is directly influenced by the dark current.

Heretofore, color television cameras, of the single-tube or two-tube type of a color multiplex system, have used vidicon camera tubes for chrominance signals. Optical filters are provided with optically black parts which are vertical at the end portions in the horizontal scanning direction of the effective picture. A video signal obtained from a camera tube by using an optical filter of this character has a black level portion which is produced by the optically black part in the trailing edge of the horizontal beam blanking of each horizontal scanning period. Heretofore, correction for black level fluctuation due to dark current fluctuation has been carried out by clamping this black level portion, whereby the DC restoration has been carried out.

However, when there is a flaw or damage in the optically black part of the optical filter, or when there is a flaw in the photoconductive film or nesa film of the camera tube corresponding to this black part, a pulse signal of high level is generated in the signal part corresponding to the optically black part in the image pickup signal. In this known system, however, when the unwanted pulse signal is generated due to a flaw, clamping occurs with this unwanted signal as a reference, and an accurate black level clamping cannot be carried out. Furthermore, the dark current level, in general, is not uniform over the entire photoconductive surface of the camera tube in the horizontal scanning direction, but is higher at the two end parts than at the central part. (This level distribution will hereinafter be referred to as "dark current shading".) By the above mentioned known system, the effect of this dark current shading could not be reduced.

Another example of a color television camera uses an optical filter comprising a color stripe filter provided on the upper or lower portion thereof laterally with an optically black part. In this color television camera, heretofore, dark current correction has been accomplished by subjecting a signal corresponding to this optically black part in the output image pickup signal to a sampling-hold operation, thereby to detect the dark current level, generating pulses corresponding to this detected level, and applying these pulses to the image pickup signal.

However, in this known system, also, there has been the effect of the above mentioned dark current shading according to the position on the photoconductive surface of the camera tube. Furthermore, as a result of errors in the installation accuracy of an optical filter with respect to the camera tube, in general, there is a possibility of the optical filter being so installed that one portion of its optically black part projects outside of the effective scanning surface of the picture of the camera tube. In this case, in the mentioned known system, a black level signal is not produced as output in correspondence with this optically black part which is projecting outside the scanned area. For this reason, detection of and correction for the dark current level become impossible. In the above mentioned known system, moreover, the circuits, such as the sampling-hold circuit and the circuit for generating correction level depending on the hold potential, are complicated. There are other difficulties such as insufficient stability.

SUMMARY OF THE INVENTION

Accordingly, it is a general object of the present invention to provide a novel and useful black level stabilization circuit in a color television camera in which the above described difficulties encountered in the prior art have been overcome.

Another and specific object of the invention is to provide a circuit which is capable of effectively accomplishing black level stabilization without being influenced by any flaw which may exist in the optically black part of the optical filter or in the part of the photoconductive surface corresponding to this black part.

Still another object of the invention is to provide a circuit which is capable of reducing the effect of dark current shading in a color television camera thereby to accomplish black level stabilization. By the use of the circuit of the present invention, black level stabilization can be positively accomplished even when there is an error in the precision of the installation of the optical filter, with respect to the camera tube.

Other objects and further features of the invention will be apparent from the following detailed description when read in conjunction with the accompanying drawings.

DETAILED DESCRIPTION

Figure 1:
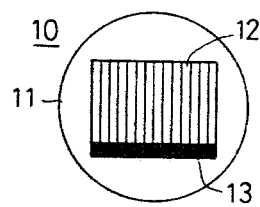
FIG. 1 is a front view of an optical filter suitable for use in a color television camera in which the black level stabilization circuit, according to the present invention, can be applied.
Figure 2:
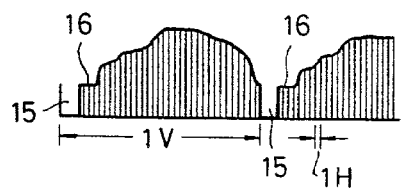
FIG. 2 is a graphical diagram indicating the waveform of a video signal produced as an output by a camera tube of a color television camera.

One example of an optical filter used in a color television camera in which the black level stabilization circuit according to the present invention can be used is shown in FIG. 1. This optical filter 10 comprises a glass plate 11 having thereon an optical color stripe filter 12 for color multiplexing and an optically black part 13 extending laterally. Light from an object to be image-picked up is passed through this optical filter and projected onto the photoconductive surface of a camera tube. As a result of beam scanning of this photoconductive surface by the camera tube, a camera tube output signal (video signal) as indicated in FIG. 2 is led out through the signal electrodes of the camera tube. In FIG. 2, the interval 1V indicates one vertical scanning period between vertical beam blanking periods 15 and 15. The narrow ordinate line interval 1H indicates one horizontal scanning period. The black level portion 16 of the back porch of each vertical beam blanking period 15 is obtained by scanning the beam of the photoconductive surface confronting the optically black part 13. The back porch actually exists through a period of, for example, 12H.

Figure 3:
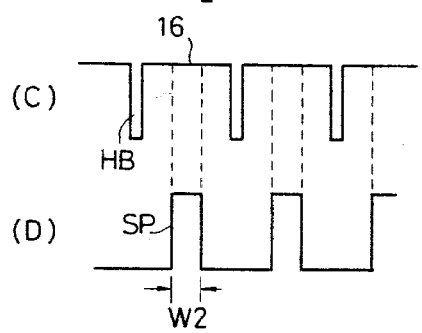
FIG. 3 is a circuit diagram of one embodiment of the black level stabilization circuit, according to the invention.
Figure 3:
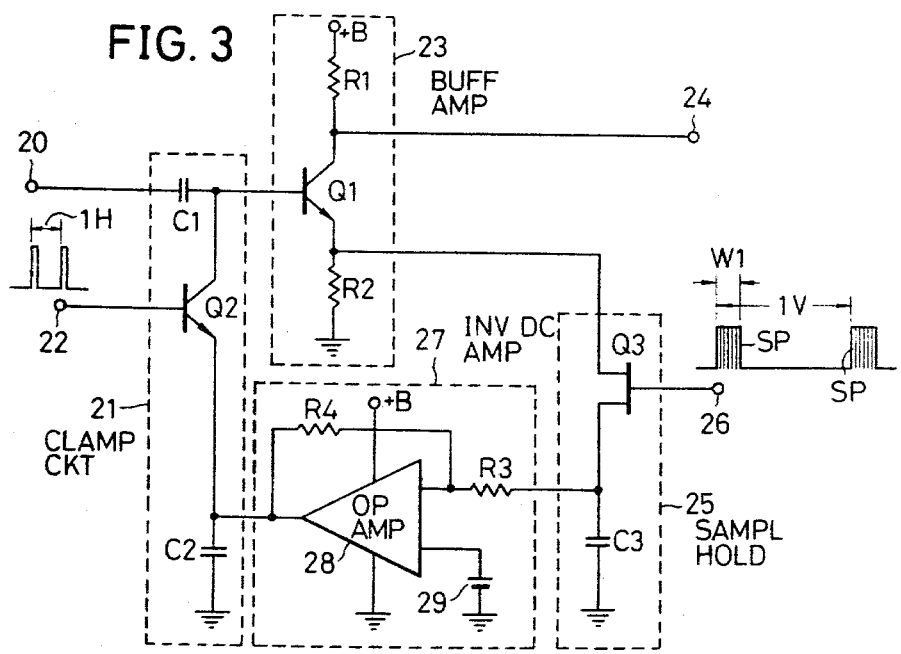

A dark current component is thus inevitably superimposed on the output signal of the camera tube. Since this dark current fluctuates, it is necessary to stabilize the black level. An embodiment of the black level stabilization circuit according to the present invention will now be described with reference to FIG. 3.

A video signal produced as an output of the camera tube (FIG. 2) is applied to an input terminal 20 (FIG. 3) of this black level stabilization circuit and thus supplied through a capacitor C1 to the base of a transistor Q1. The capacitor C1, together with a transistor Q2 and a capacitor C2, constitutes a clamping circuit 21. The transistor Q2 becomes conductive each time a horizontal scanning period pulse of positive polarity is applied through a terminal 22 to its base. The tip end of the vertical beam blanking 15 of the above mentioned input video signal is clamped by the voltage of the capacitor C2 in the clamping circuit 21.

The video signal which has passed through the clamping circuit 21 is led out, as an output video signal from the collector of the transistor Q1 constituting a buffer amplifier 23, through an output terminal 24. The emitter of the transistor Q1 is connected to the source of a field effect transistor (FET) Q3 of a sampling-hold circuit 25. This FET Q3 assumes its conductive state when a sampling pulse SP is applied through a terminal 26 to its gate, during each vertical scanning period. A capacitor C3 is connected between the drain of the FET Q3 and ground (earth). Each time the FET Q3 becomes conductive in response to the sampling pulse SP, a signal from the emitter of the transistor Q1 is changed in the capacitor C3.

Figure 4:
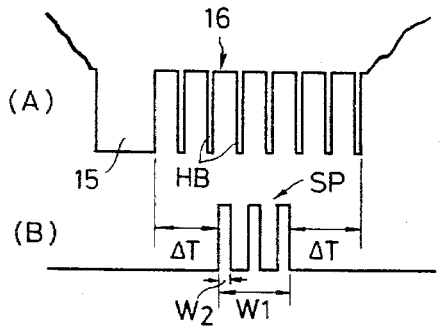
FIGS. 4(A) and 4(B) are graphical diagrams respectively indicating the relationship between the black level portion of a video signal and sampling pulses.
FIGS. 4(C) and 4(D) are graphical diagrams respectively showing enlargements of portions of FIGS. 4(A) and 4(B)

Here, as indicated in FIG. 4(B), the sampling pulses SP comprise a plurality of pulses generally corresponding to substantially the central part of the black level portion 16 of the video signal indicated in FIG. 4(A). These signals do not correspond to the horizontal beam blanking part HB (FIG. 4B). The selection of the width W1 of the sampling pulses will be described hereinafter. Accordingly, a level in the neighborhood of the central part of the black level portion 16 is sampled at each vertical period and stored as a charge on the capacitor C3, which is then held.

If there is a flaw in the optically black part 13 of the above mentioned optical filter 10, a high level impulse exists in the black level portion 16 of the video signal which is applied to the terminal 20. This instantaneous level fluctuation will be integrated or averaged by the capacitor C3.

The voltage which has been held in the capacitor C3 is supplied to an inversion DC amplifier 27 having an amply high input impedance and is applied through a resistor R3 to the inverting input terminal of an operational amplifier 28. The non-inverting input terminal of this operational amplifier 28 is connected to a reference voltage source 29. The resulting signal is inverted and amplified in the operational amplifier 28 and is charged into and stored on the capacitor C2 of the clamping circuit 21. The voltage of the capacitor C2 is used as the above mentioned clamping voltage.

Here, the sampling-hold circuit 25 and the inversion DC amplifier 27 constitute a negative feedback circuit with respect to the clamping circuit 21. As a result, the voltage of the capacitor C2 fluctuates in a state which is equivalent to the inverted state of the dark current fluctuation of the video signal. Accordingly, the clamping voltage at the tip end of the vertical beam blanking 15 fluctuates in the clamping circuit 21 so that, as an effective result, the black level portion 16 of the video signal becomes constant irrespective of a dark current fluctuation which may occur due to a cause such as temperature fluctuation. For this reason, the black level portion 16 of the video signal is made constant and is stabilized.

The constants of the various circuit elements or components in the present embodiment of the invention are as follows:

| Resistors | | Capacitors | | |
| --- | --- | --- | --- | --- |
| R1 | 1 KΩ | C1 | 0.033 | μF |
| R2 | 1 KΩ | C2 | 100 | μF |
| R3 | 10 KΩ | C3 | 10 | μF |
| R4 | 820 KΩ | | | |

The level fluctuation, due to dark current fluctuation of the output video signal obtained from the output terminal, is reduced to a value which is an inverse number multiple of the negative feedback gain of the above mentioned negative feedback circuit. In accordance with the present embodiment of the invention, the worst value conditions of the dark current fluctuation are from 0.005 μA (corresponding to −10° C.) to 0.1 μA (corresponding to +60° C.). If a level of the output video signal of the camera tube is 0.25 $\mu A_{p-p}$, and if a negative feedback gain (corresponding to the DC gain of the inversion DC amplifier 27) is 60 dB, for example, the dark current fluctuation with respect to the video signal will be 0.1 $\mu A/0.25$ $\mu A_{p-p}$ at the input terminal 20. The black level fluctuation will be 40%, but at the output terminal 24, the dark current fluctuation with respect to the video signal will be $$\frac{0.1\ \mu A}{1000} / 0.25\ \mu A_{p-p}.$$

Thus, the black level fluctuation will be reduced to 0.004%. Therefore, the black level fluctuation of the video signal led out through the output terminal 24 will be greatly reduced to a substantially small degree.

In the above described embodiment of the invention, a circuit organization wherein the inversion DC amplifier 27 is connected between the buffer amplifier 23 and the sampling-hold circuit 25 may be used. Furthermore, the optically black part 13 of the optical filter 10 may be provided at the upper part. The black level portion 16 of the video signal may be positioned at the front porch of the vertical beam blanking 15.

The above described circuit removes level fluctuations arising from dark current fluctuations due to causes such as temperature fluctuations. The present invention also provides means by which the effective level of fluctuations due to dark current shading can also be reduced, as described below.

Figure 5:
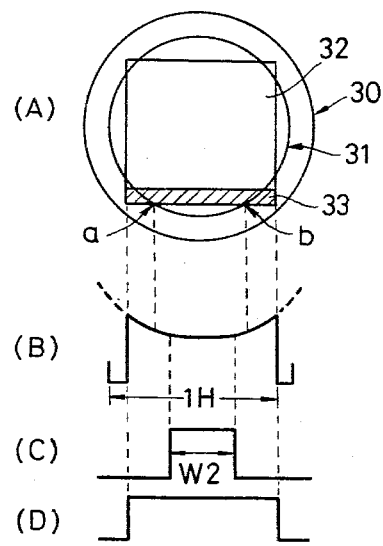
FIGS. 5(A) through 5(D) are respectively a front view of the photoconductive surface of a camera tube, a waveform diagram of a dark current, and sampling pulse waveform diagrams.

In general, a dark current is obtained when the photoconductive surface 30 of a camera tube as shown in FIG. 5(A) is scanned in the horizontal. This dark current is not uniform since it exhibits a dark current shading characteristic which increases toward the peripheral edges of the photoconductive surface. Accordingly, the effective picture 32 is ordinarily positioned substantially within the inner side of the dark current inflection position 31 where the dark current increases abruptly.

The picture part 33 corresponds to the optically black part of the optical filter on the photoconductive surface 30 which intersects the dark current inflection position 31 at points a and b. Then, the dark current obtained when the beam scans this part 33 increases abruptly on the two end sides from the positions corresponding to the points a and b as indicated in FIG. 5(B). Accordingly, as indicated in FIG. 5(D), when the width of one of the sampling pulses SP is taken near one horizontal scanning period, a sampling-hold operation is carried out at a point where the dark current is high, and correct dark level DC cannot be restored.

In accordance with the present invention, the width of one of the sampling pulses is selected at a width W2 corresponding to the relatively flat portion of the dark current as indicated in FIG. 5(C). The relationship between the horizontal scanning period of the black level portion 16 of the video signal and the width W2 of each of the sampling pulses SP is indicated in a magnified manner in FIGS. 4(C) and 4(D). In the circuit of the present invention, the effect of dark current shading is reduced since the width W2 of each of the sampling pulses SP is selected as mentioned above. In the present embodiment of the invention, the width W2 of the pulse of FIG. 5(C) is selected to be, for example, 70% of the width of the pulse indicated in FIG. 5(D).

A pulse of this width W2 can be obtained by a circuit comprising, in cascade connection, a first monostable multivibrator triggered by a horizontal beam blanking pulse and a second monostable multivibrator triggered by the output of the first monostable multivibrator. A pulse having the desired pulse width can be produced by appropriately selecting the time constants of these monostable multivibrators.

Figure 6:
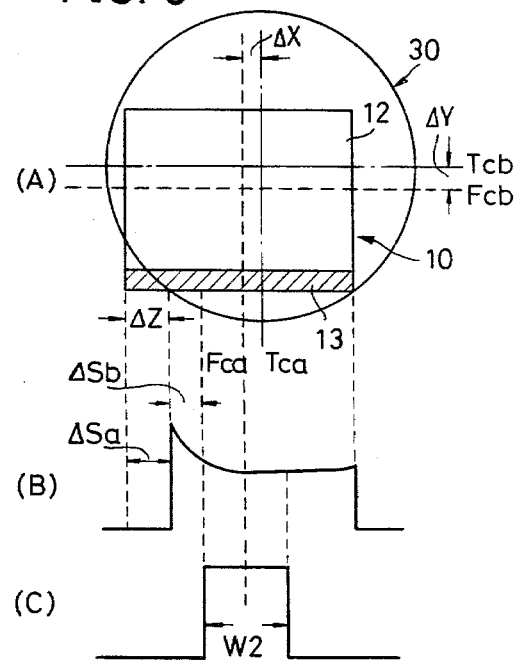
FIGS. 6(A) through 6(C) are respectively a front view indicating an error in the installation of an optical filter relative to the photoconductive surface of a camera tube, a waveform diagram of a dark current, and sampling pulse waveform diagrams.

Furthermore, in the assembly process during the production of a color television camera, when the optical filter 10 is being mounted in the camera tube, some error unavoidably occurs in the mounting position of the optical filter relative to the photoconductive surface. For example, the optical filter 10 FIG. 6(A) has been mounted at a position which is offset relative to the photoconductive surface 30 of the camera tube. The vertical and horizontal axes Fca and Fcb of the optical filter 10 are respectively displaced by ΔX and ΔY leftwardly and downwardly, as viewed in FIG. 6(A), from the vertical and horizontal axes Tca and Tcb of the photoconductive surface 30. In this case, the optically black part 13 projects out by a width ΔZ from the photoconductive surface 30. Consequently, a signal is not obtained from the part confronting the optically black part of this width ΔZ. The waveform of the resulting signal becomes as indicated in FIG. 6(B). In this waveform, there is no signal in the part ΔSa, while the part ΔSb is a dark current shading arising from the peripheral part of the photoconductive surface.

Here, it will be apparent that, if the pulse width of each sampling pulse is selected to be equal to the entire horizontal beam scanning period as indicated in FIG. 5(D), dark current sampling and detection cannot be carried out accurately and positively with respect to the signal indicated in FIG. 6(B). In the present invention, however, since the width of each pulse (FIG. 6(C)) of the sampling pulses SP is selected at the width W2, which is less than the horizontal beam scanning period, a part which has a signal and, moreover, is a relatively flat signal can be sampled with respect to a signal of a waveform as indicated in FIG. 6(B). Accurate and positive dark current detection can then be accomplished. Thus, in accordance with the present invention, accurate and positive dark current detection can be carried out even when the optical filter 10 has been mounted in an offset position as indicated in FIG. 6(A) relative to the photoconductive surface 30 of the camera tube.

In a camera tube, in general, there are cases wherein the scanning position of the beam, relative to the photoconductive surface, fluctuates as a result of causes such as changes occurring with the elapse of time and variation of the terrestrial magnetism, depending on the place of use. In such a case, as indicated in FIG. 4(A), the black level portion 16, obtained in correspondence with the optically black part of the optical filter, sometimes deviates by a maximum of ΔT in terms of the time axis. In the present invention, however, as indicated FIGS. 4(A) and 4(B), the width of the sampling pulses is selected to be the narrow width W1 which is reduced by a time ΔT from each of the two extremities of the black level portion 16. For this reason, the sampling pulses SP are continually capable of positively sampling the black level portion 16 regardless of variations caused by such things as the passage of time and variation of the terrestrial magnetism. In this connection, if the vertical blanking width of the ultimate video signal has a wide value which is displaced by a time ΔT beyond the ends of the black level portion 16, there is also no possibility of the black part of the black level portion 16 entering the video picture.

Figure 7:
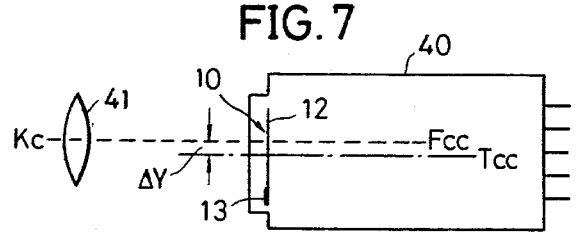
FIG. 7 is a side view for a description of an installation error of an optical filter relative to a camera tube.

By the use of the present invention, even when the optical filter 10 is mounted in a position which is offset relative to the photoconductive surface 30 as indicated in FIG. 6(A), a sampling of the black level portion can be positively carried out. Even in this case, the effect of dark current shading is evident, although to a slight degree, as is apparent from FIG. 6(B). Fundamentally, it is desirable that the optical filter 10 be so mounted that the optically black part 13 will not project outside of the photoconductive surface 30. Accordingly, in order to mount the optical filter 10 in this manner, the camera tube 40 is so designed that the optical filter 10 is mounted at a position such that its central axis Fcc will be offset from the central axis Tcc of the photoconductive surface of the camera tube 40 by a mounting error $\Delta Y$, which is the maximum predicable, on the side opposite (in the above illustrated example) the optically black part 13 as indicated in FIG. 7.

By this measure, even if the optical filter 10 is, by mounting error, at a position offset downwardly by a distance $\Delta Y$ from the design value, for example, the optically black part 13 will not project outside the photoconductive surface since the optical filter 10 is mounted at a position such that its central axis Fcc coincides with the central axis Tcc of the photoconductive surface. Furthermore, in the case where, as a supposition, the optical filter 10 is mounted in a position offset upwardly by a distance $\Delta Y$ from the design value, the optically black part, of course, will not project out from the photoconductive surface. In this case, the gap of the upper part of the optical filter 10 will project out from the photoconductive surface. This will not matter since the effective picture surface is smaller than the optical filter. It will be obvious, of course, that the optical center is so designed that the central axis Fcc of the color stripe filter 12 of the optical filter 10 and the optical central axis Kc of the taking lens 41 will coincide.

Figure 8:
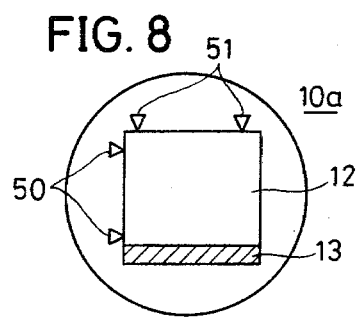
FIG. 8 is a front view of an optical filter provided with adjustment marks.

Furthermore, since a signal corresponding to the optically black part has been eliminated from the final video signal obtained from the color television camera, adjustments of deflection size, centering, and the like on the basis of the final video signal cannot be readily carried out. Accordingly, in the optical filter 10a illustrated in FIG. 8, marks 50 for vertical deflection adjustment are provided on a lateral edge of the stripe filter 12, and marks 51 for horizontal deflection adjustment are provided on the upper edge thereof. By the use of this optical filter, adjustments of deflection size, centering, and the like can be easily carried out by utilizing these marks 50 and 51. Therefore, the optically black part 13 of the optical filter can be positioned at the optimum deflection position.

Further, this invention is not limited to these embodiments. Variations and modifications may be made without departing from the scope of the invention.

What is claimed is:

1. A circuit for stabilizing a black level of an output signal of a camera tube in a color television camera in which said camera tube includes an optical filter means having an optically black part extending in parallel with a beam scanning direction of the camera tube, said stabilizing circuit comprising: a clamping circuit means for clamping at a clamping voltage an output signal of the camera tube during a horizontal beam blanking period and for restoring a DC component of the output signal; means responsive to a sampling pulse supplied every vertical scanning period within a scanning period of the black level signal portion corresponding to the optically black part of the optical filter means for sampling and holding an output signal of the clamping circuit means; and feedback circuit means for substantially negatively feeding back a holding voltage from said sampling and holding means to the clamping circuit means as said clamping voltage.

2. A black level stabilizing circuit as claimed in claim 1, in which each of said sampling pulses comprises a train of pulses, each of said train of pulses having a pulse width W2 which is more narrow than the width of a horizontal scanning period beam width in the black level signal portion corresponding to the optically black part of the optical filter means in the output signal of the camera tube.

3. A black level stabilizing circuit as claimed in claim 1, in which each of said sampling pulses comprises a train of pulses, the width W2 of each of said train of pulses corresponding to central and neighborhood parts of the horizontal scanning beam period in the black level signal portion in which there are relatively small variations of the dark current corresponding to the beam scanning position on the photoconductive surface of the camera tube.

4. A black level stabilizing circuit as claimed in claim 1 in which each of said sampling pulses comprises a train of pulses, the pulse width W2 of each of said train of pulses being in the order of 70% of the horizontal scanning beam period width.

5. A black level stabilizing circuit as claimed in claim 1 in which the width W1 of the sampling pulse is smaller than the entire width of the black level signal portion corresponding to the optically black part of the optical filter means in the output signal of the camera tube.

6. A circuit for stabilizing a black level of an output signal of a camera tube in a color television camera in which said camera tube includes an optical filter means having an optically black part extending in parallel with a beam scanning direction of the camera tube, said stabilizing circuit comprising: a clamping circuit means for clamping an output signal of the camera tube during a horizontal beam blanking period and for restoring a DC component of the output signal; means responsive to a sampling pulse supplied every vertical scanning period for sampling and holding an output signal of the clamping circuit; and feedback circuit means for substantially negatively feeding back a holding voltage from said sampling and holding circuit to the clamping circuit, in which the optical filter means is mounted to the camera tube so that the optically black part of the optical filter means is nominally offset from the predetermined position by a specific distance which is determined by a maximum mounting error with respect to the center of the photoconductive surface.

* * * * *